UNITED STATES PATENT OFFICE.

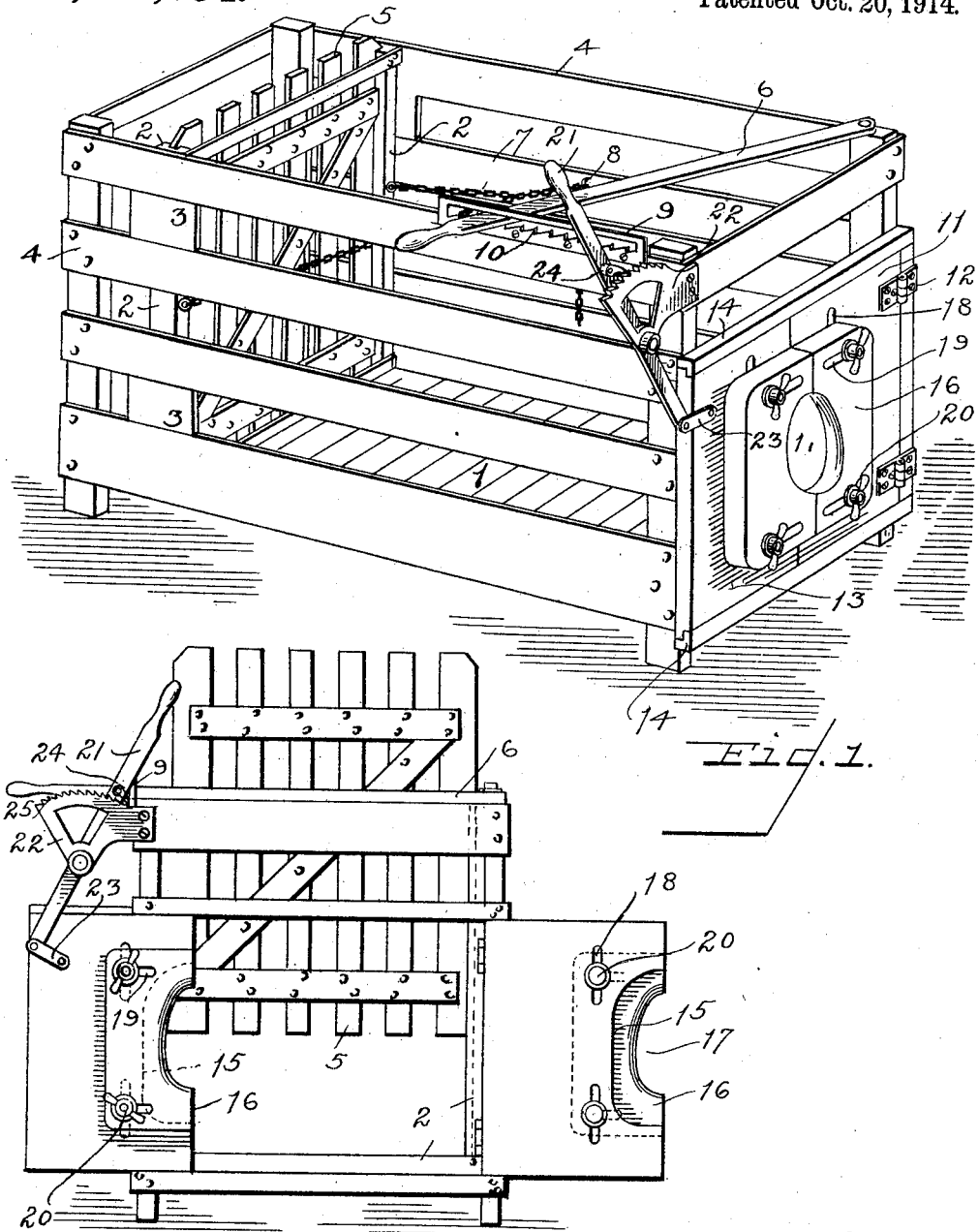

OLIVER C. APPLE, OF URBANA, OHIO.

STOCK-RACK.

1,114,094. Specification of Letters Patent. Patented Oct. 20, 1914.

Application filed February 15, 1913. Serial No. 748,524.

*To all whom it may concern:*

Be it known that I, OLIVER C. APPLE, citizen of the United States, residing at Urbana, in the county of Champaign and State of Ohio, have invented certain new and useful Improvements in Stock-Racks, of which the following is a specification.

My invention relates to appliances used in the care of domestic animals, and particularly to veterinary stocks for securely holding animals during surgical or other operations.

The device herein described is particularly adapted for holding swine while a ring is being secured in the nose of the animal; for holding calves during the dehorning operation; for holding sheep while identification tags are being applied to their ears or for holding any such animals during the performance of any other usual or necessary operations.

The device is further designed for use as a shipping crate for the transportation of such animals from place to place.

The object of the invention is to simplify the structure as well as the means and mode of operation of such devices, whereby they will not only be cheapened in construction, but will be more efficient in use, easily operated, readily and quickly adjusted to accommodate animals of different sizes and unlikely to get out of repair.

With the above primary and other incidental objects in view, as will more fully appear in the specification, the invention consists of the features of construction, the parts and combinations thereof, and the mode of operation or their equivalents as hereinafter described and set forth in the claims.

In the drawings Figure 1 is a perspective view of the assembled device with the stock or stanchion closed. Fig. 2 is a front elevation of the device with the stock or stanchion open and the rear gate partially elevated.

Like parts are indicated by similar characters of reference throughout the views.

In constructing the device there is employed a rectangular pen 1 of sufficient size to accommodate the largest animal to be operated upon. This pen is open at its rearward extremity through which opening the animal enters. Located within the pen or inclosure, adjacent to the open end thereof, is a movable frame 2, capable of a sliding movement in a forward and aft direction. The frame 2 may be mounted to slide in any suitable guides or ways in the structure. In the drawing, the frame 2 has been shown as provided with bearing blocks 3, which engage between the parallel spaced side bars 4 of the inclosure to support and guide the frame in its forward and aft movement. Slidingly mounted in vertical guides in the frame 2 is a gate 5. The gate 5 is elevated by hand to admit the animal to the inclosure and is lowered in the rear of the animal to prevent its escape.

Pivoted adjacent to the forward end of the inclosure, is a lever 6. The lever 6 is connected to the sliding frame 2 by any sort of a link or connection. In the drawing, the connection has been shown as a Y shaped chain 7, attached to the frame 2 at mid height points at each side thereof and engaging a hook 8 upon the lever 6. By oscillating the lever 6, the frame 2 and the gate 5, carried thereby, are shifted forward, compelling the animal within the inclosure to advance toward the stock or stanchion, located at the forward end of the pen. By engaging different links of the chain 7 with the hook 8, the device may be adapted to animals of different sizes.

Secured to the uppermost bar 4 of the pen is a guide or keeper 9 for the lever 6, through which the lever projects. The guide or keeper, is provided with a series of teeth or notches 10, to be engaged by a corresponding tooth carried by the lever 6, to retain the lever 6 and the sliding frame 2 in their adjusted positions.

Located at the forward end of the pen or the inclosure, is the stock or stanchion, within which the neck of the animal is engaged to secure it during the operation. The stock or stanchion comprises two relatively adjustable members, each of which carries adjustable yoke pieces. One of the stanchion members comprises a door 11, hinged at 12 to the structure. The other half of the stock or stanchion comprises a sliding door 13, mounted to reciprocate in suitable guide ways 14. Each of the doors 11 and 13 have enlarged recesses 15, formed in their adjacent edges, and registering one with the other. The recesses 15 extend sufficiently low in the doors 11 and 13 to accommodate the smallest animal, and sufficiently high to accommodate the largest animal. These notches or recesses 15 are of such depth, that their combined width will be equal to or greater than the thickness of the neck of the largest animal operated upon.

Adjustably secured to the doors 11 and 13 are yoke pieces 16, having registering notches or recesses 17 in their adjacent edges. These yoke pieces 16 are adjustable to different positions upon the doors 11 and 13, whereby the neck opening formed by the registering notches 17 may be adjusted, vertically or laterally within the limit of the opening formed by the registering notches 15 of the doors. The yoke pieces 16 may be secured in their adjusted positions in any suitable manner. A series of holes may be provided in the doors 11 and 13 in the yoke pieces 16, through which the said parts may be bolted in any of their positions of adjustment. However in the drawings, the doors have been shown provided with vertical slots 18, and the yoke pieces with transverse slots 19 adapted to intersect the slots 18 of the doors, when the yoke pieces are in the registering portions of the slots 18 and place. Clamping bolts 20 project through 19. By releasing the clamping bolts 20, the yoke pieces may be adjusted laterally within the limit of the slots 19, or vertically within the limit of the slot 18 or may be adjusted simultaneously in both slots, thus providing a universal adjustment for the yoke pieces. By this means the opening formed by the registering recesses 17 in the yoke pieces, may be adjusted to different heights or by adjusting said yoke pieces to or from each other, the said opening may be varied in its width. It is obvious that the vertical slots may be in the yoke pieces and the horizontal slots in the doors. The sliding door 13 is reciprocated by the means of an operating lever 21, pivoted upon a bracket 22. The lower extremity of the lever 21 is connected to the door 13 by a link 23. A pawl 24 upon the lever 21, engages any one of the series of teeth 25 in the bracket 22 to lock the door 13 in its operative position.

In practice, the yoke pieces first having been adjusted to approximately the height and size of the neck of the animal to be operated upon, the rear gate 5 is elevated and the animal is induced to enter the inclosure. The sliding door 13 is partially withdrawn, forming an opening of comparatively large size between the door 13 and the door 11. The tendency of the animal within the inclosure will be to escape therefrom, through such enlarged opening. When the animal has advanced its head through such opening with view to escape, the operating lever 21 is operated to close the sliding door 13, causing the neck of the animal to be caught within the opening formed by the notches or recesses 17 of the yoke pieces 16 with the animal's head protruding beyond the doors. If the animal refuses to advance within the inclosure and thrusts its head forward between the yoke pieces, the operating lever 6 is operated, to draw the sliding frame 2 and gate 5 forward, thus crowding the animal forward within the inclosure, until its neck is in position to be engaged by the yoke upon the closing movement of the door 13. When the operation has been completed and it is desired to release the animal, the sliding door 13 is withdrawn and the hinged door 11 is swung open as shown in Fig. 2, whereupon the animal escapes from the forward end of the inclosure. Any suitable latch or fastening may be employed to secure the door 11 in closed position.

For transportation, the animal may be confined in the pen or inclosure which in such event, is used merely as a crate, the stock or stanchion not being employed.

From the above description it will be apparent that there is thus provided a device of the character described, possessing the particular features of advantage before enumerated as desirable, but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim;

1. In a stock rack, an inclosure, two relatively movable doors therefor, yoke pieces carried by the doors adapted to engage the neck of the animal, said yoke pieces being adjustable to different positions upon the door, to accommodate animals of different sizes, substantially as specified.

2. In a stock rack, an inclosure, a sliding door therefor, a yoke divided into separable pieces, one of the yoke pieces being adjustably secured to the sliding door, the other yoke piece being adjustably secured to that portion of the structure upon which the door abuts when closed, whereby when the sliding door is closed, the yoke pieces will register, one with the other, substantially as specified.

3. In a stock rack, an inclosure, a stanchion located at one end thereof, comprising a movable member and a normally stationary member, and a divided yoke, the portions of which are adjustably secured to said movable and normally stationary members in positions to register one with the other, when the stanchion is closed, said divided yoke members, being adjustable upon their supporting members, substantially as specified.

In testimony whereof, I have hereunto set my hand this 29th day of January, 1913.

OLIVER C. APPLE.

Witnesses:
J. P. NORTHCUTT,
MABLE MODENA.

Copies of this patent may be obtained for five cents each, by addressing the "Commissioner of Patents, Washington, D. C."